(12) United States Patent
Hallauer et al.

(10) Patent No.: US 12,533,012 B2
(45) Date of Patent: Jan. 27, 2026

(54) METHOD FOR FIXING CABLES FOR ACTUATING THE DISTAL HEAD OF A MEDICAL DEVICE

(71) Applicant: AXESS VISION TECHNOLOGY, Joue-les-Tours (FR)

(72) Inventors: Emmanuel Hallauer, Sache (FR); Jérôme Couratin, Saint-Pierre-de-Corps (FR)

(73) Assignee: AXESS VISION TECHNOLOGY, Joue-les-Tours (FR)

( * ) Notice: Subject to any disclaimer, the term of this patent is extended or adjusted under 35 U.S.C. 154(b) by 407 days.

(21) Appl. No.: 17/793,074

(22) PCT Filed: Jan. 15, 2021

(86) PCT No.: PCT/FR2021/050075
§ 371 (c)(1),
(2) Date: Jul. 15, 2022

(87) PCT Pub. No.: WO2021/144544
PCT Pub. Date: Jul. 22, 2021

(65) Prior Publication Data
US 2023/0037743 A1 Feb. 9, 2023

(30) Foreign Application Priority Data
Jan. 17, 2020 (FR) .................... 20 00455

(51) Int. Cl.
*A61B 1/00* (2006.01)
*A61B 1/005* (2006.01)

(52) U.S. Cl.
CPC .......... *A61B 1/0011* (2013.01); *A61B 1/0052* (2013.01); *A61B 1/0057* (2013.01)

(58) Field of Classification Search
CPC ... A61B 1/0011; A61B 1/0052; A61B 1/0057; A61B 1/00066; A61B 2018/00619; A61B 2017/00955
(Continued)

(56) References Cited

U.S. PATENT DOCUMENTS 4,430,142 A * 2/1984 Ochi .................... B29C 66/131
156/380.4
4,984,415 A 1/1991 Kuroda
(Continued)

FOREIGN PATENT DOCUMENTS

CN 105962985 A 9/2016
EP 3244958 A1 11/2017
(Continued)

OTHER PUBLICATIONS

Globalspec, "10 Kinds of Thermoplastics and What You Can Do With Them". (Year: 2017).*

*Primary Examiner* — Anh Tuan T Nguyen
*Assistant Examiner* — James Edward Boice
(74) *Attorney, Agent, or Firm* — Oliff PLC

(57) ABSTRACT

A method for fixing one end of an actuation cable configured to allow orienting of the distal head of a medical device including providing a pivoting part provided with at least one fixing pin made of thermoplastic material for fixing a proximal end of an actuation cable, arranging, from the terminal part of the pin, a radially through recess to allow the insertion of the actuation cable, positioning the actuation cable inside the recess, letting a free end of the pin project, and heating at least the free end of the pin and applying a pressure on the pin to ensure, by welding, the fixing of the actuation cable with the pivoting part.

6 Claims, 4 Drawing Sheets

(58) Field of Classification Search
USPC .......................................................... 600/146
See application file for complete search history.

(56) References Cited

U.S. PATENT DOCUMENTS

| | | | |
|---|---|---|---|
| 5,797,931 A * | 8/1998 | Bito | A61B 17/1285 606/127 |
| 6,673,012 B2 | 1/2004 | Fujii et al. | |
| 10,159,491 B2 | 12/2018 | Gokharu | |
| 2008/0046122 A1 * | 2/2008 | Manzo | A61B 90/98 700/245 |
| 2013/0037321 A1 * | 2/2013 | Murata | B60R 16/0215 174/72 A |
| 2017/0056675 A1 * | 3/2017 | Bortolin | A61B 5/686 |
| 2019/0142247 A1 * | 5/2019 | Maeda | A61B 1/018 600/106 |
| 2019/0231179 A1 * | 8/2019 | Hansen | A61B 1/0011 |
| 2019/0374751 A1 * | 12/2019 | Finson | A61M 25/10182 |

FOREIGN PATENT DOCUMENTS

| | | |
|---|---|---|
| EP | 3517017 A1 | 7/2019 |
| FR | 2477465 A | 9/1981 |
| FR | 2613707 A1 | 10/1988 |
| WO | 2016/188537 A1 | 12/2016 |

\* cited by examiner

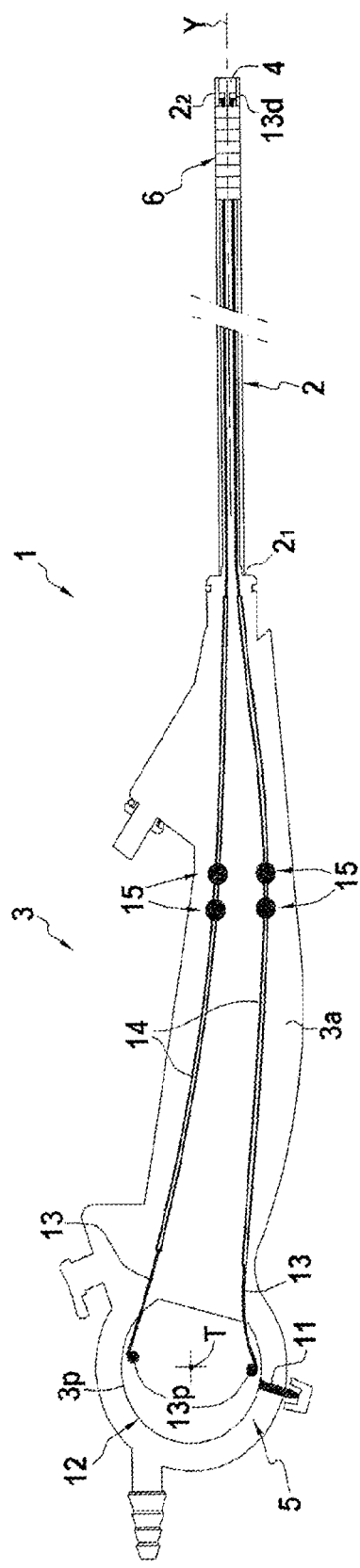
[Fig. 1]

[Fig. 2]
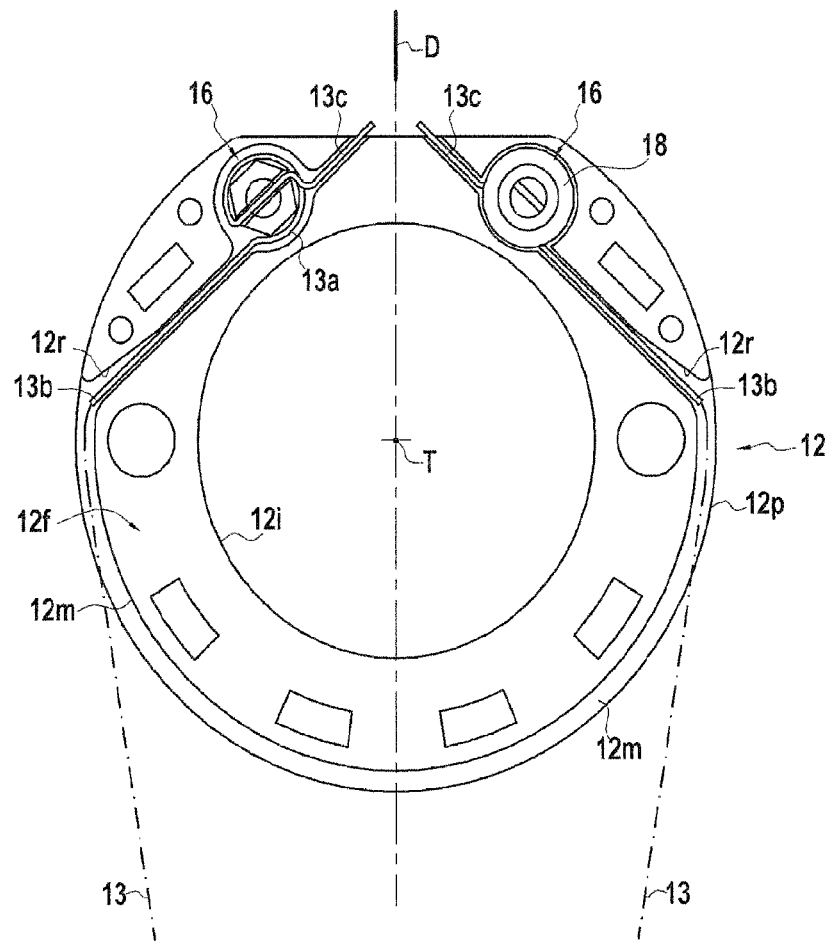
[Fig. 3]
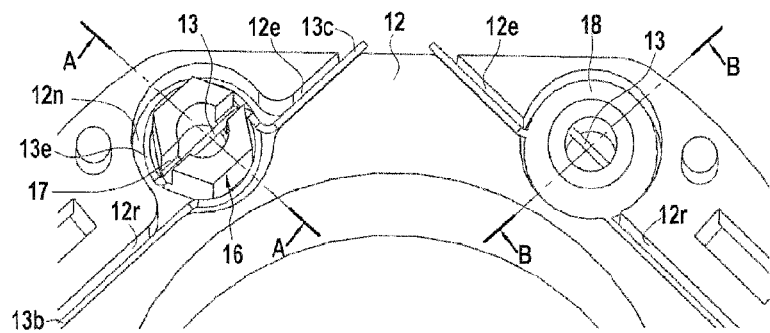

[Fig. 3A]
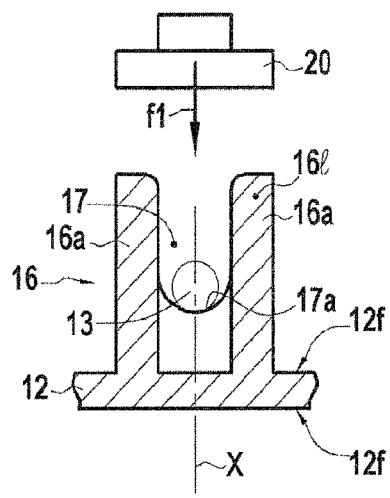
[Fig. 3B]
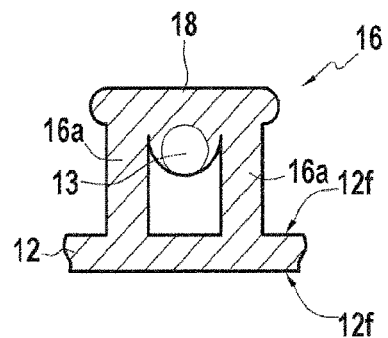
[Fig. 4]
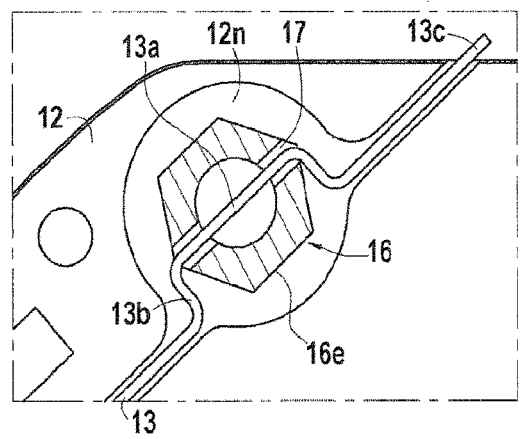

[Fig. 5]
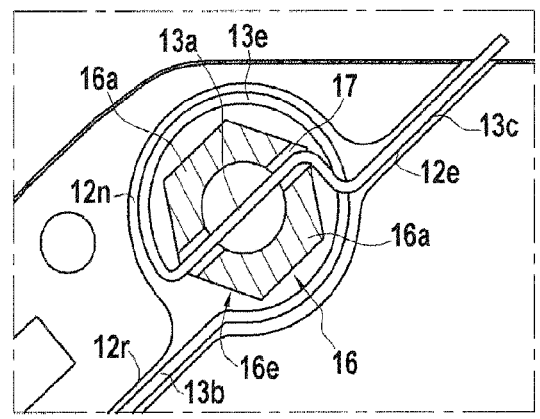
[Fig. 6]
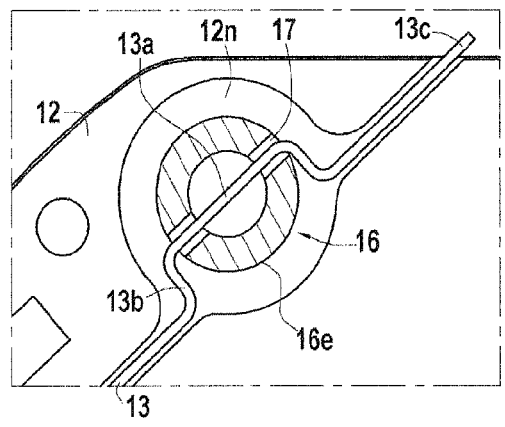

METHOD FOR FIXING CABLES FOR ACTUATING THE DISTAL HEAD OF A MEDICAL DEVICE

TECHNICAL FIELD

The present disclosure relates to the technical field of medical devices in a general sense for accessing the interior of a body such as a cavity or a channel for example, and it relates more specifically to the catheter-type medical devices and preferably the endoscope-type medical devices.

The object of the disclosure finds a particularly advantageous application for reusable or single-use endoscopes.

The present disclosure relates more specifically to the fixing of the actuation cables of the bending structure that allows orienting the distal head of such catheter or endoscope-type medical devices, this distal head being adapted to ensure multiple functions such as the visualization, the supply of fluid, the aspiration of fluid, the supply of instruments, the collection of samples or the conduction of surgical procedures, for example.

The catheter or endoscope-type medical device in accordance with the disclosure finds particularly advantageous applications for allowing access to the inner surface of a hollow organ, of a cavity or of a natural or artificial conduit of the body human with a view to performing various operations for therapeutic, surgical or diagnostic purposes.

The catheter or endoscope-type medical device according to the disclosure is used for diagnostic, therapeutic or surgical purposes for the inspection of all inner parts of the human body accessible by the natural or artificial paths. For example, the medical device according to the disclosure can be used in the field of urinary tract, gastrointestinal tract, respiratory system, cardiovascular system, trachea, sinus cavity, women's reproductive system, abdominal cavity or any other part of the human body to be explored by a natural or artificial path.

BACKGROUND

In general, a medical endoscope includes, as described for example by patent application WO 2016/188537, a control handle to which an insertion tube is fixed. This tube includes a distal head equipped with an optical visualization system that allows illuminating and examining the organ, the cavity or the conduit of the human body. Upstream of this distal head, the insertion tube includes a bending structure or deflection part that allows orienting the distal head using one or several actuation cables mounted inside the insertion tube. Each actuation cable includes a distal end fixed to the distal head and a proximal end on which a control mechanism fitted to the handle acts to ensure the sliding of the cables and consequently the folding of this deflection part in order to orient the head distal.

Conventionally, this control mechanism includes a control lever acting on a pivoting part on which the proximal end of the actuation cables is fixed. The fixing of the actuation cables on the pivoting part is ensured by threading the end of each actuation cable in holes arranged in the pivoting part and forming a loop. A tubular sleeve threaded onto the actuation cable is crimped onto the actuation cable to allow it to be stopped in translation. Different fixing techniques are known, such as fixing by screwing in particular. In general, it appears that the operation of fixing the proximal end of the actuation cables on the pivoting part is a relatively delicate operation to carry out which may lead to unreliable fixing.

Particularly, document EP 3 517 017 describes an endoscope provided with a control handle assembled to a catheter whose distal part is flexible and steerable thanks to cables controlled thanks to a monitoring element. The cables are positioned in this monitoring element thanks to two split rivets. In U.S. Pat. No. 6,673,012, the endoscope cables are held in position thanks to pulleys. Finally, document EP 3 244 958 describes a catheter including a bending system in order to direct its distal part. The bending system includes two rotary elements of different diameters, coupled together, whose centers are not aligned and each connected to an actuation cable.

SUMMARY

The present disclosure therefore aims to overcome the drawbacks of the state of the art by proposing a new technique for fixing to the pivoting part, the proximal end of the actuation cables of the distal head of a catheter or endoscope-type medical device, this new technique ensuring an ease of implementation that allows reducing its cost while presenting an optimum fixing quality durable in time.

To achieve such an objective, the method according to the disclosure aims to fix one end of an actuation cable forming part of a control mechanism that allows orienting the distal head of a catheter or endoscope-type medical device, the method including the following steps:

providing a pivoting part forming part of a control mechanism that allows orienting the distal head of a medical device, this pivoting part being provided with at least one pin made of thermoplastic material for fixing a proximal end of an actuation cable;

arranging from the terminal part of the pin, a radially through recess to allow the insertion of the actuation cable;

positioning the actuation cable inside the recess, letting a free end of the pin project;

heating at least the free end of the pin and applying a pressure on the pin to ensure, by welding, the fixing of the actuation cable with the pivoting part.

According to one advantageous embodiment characteristic, a pressure is exerted on the pin to move the material until obtaining a bead in contact with the actuation cable.

Advantageously, a pressure is exerted on the pin until obtaining a bead at least partially closing the recess.

According to one advantageous alternative embodiment, the pivoting part and the pin are made of a thermoplastic material.

Typically, the recess is arranged with an abutment bottom for inserting the actuation cable into the recess, the depth of the recess being such that the free end of the pin extends beyond the actuation cable.

Preferably, the recess is arranged with a depth equal to a value included between 1.5 and 5 times the diameter of the actuation cable.

According to one preferred alternative embodiment, the pivoting part is provided with at least one pin including a right polygonal external cross-section.

According to this preferred alternative embodiment, part of the actuation cable is wound around at least part of the pin.

For example, an ultrasonic welding ensures the fixing of the actuation cable to the pivoting part.

In general, hot and pressure riveting ensures the fixing of the actuation cable to the pivoting part.

Another object of the disclosure is to propose a pivoting part of a control mechanism that allows orienting the distal head of a catheter or endoscope-type medical device, this pivoting part being provided with at least one pin made of thermoplastic material provided with a radial through recess in which an actuation cable is mounted, the pin having a deformed free end in the form of a bead of thermoplastic material cooperating with the actuation cable to bind the actuation cable to the pivoting part.

Advantageously, the pin and the pivoting part are made of thermoplastic material.

According to one alternative embodiment, the pin is at least partly externally bordered by a positioning housing for the actuation cable.

Preferably, the positioning housing opens out into a guide groove including at least one circular groove centered on the axis of rotation of the pivoting part.

Preferably, the positioning housing opens out into a guide groove including a rectilinear groove for connection to the circular segment.

For example, the positioning housing opens out into a guide groove including at least one positioning end groove for the end part of the actuation cable.

The pivoting part is in the form of a disk or an annular ring to form an actuation pulley.

According to one exemplary embodiment, the pivoting part includes two pins for fixing, each, an actuation cable, these pins being located symmetrically opposite with respect to a diametral plane of the pivoting part.

Another object of the disclosure is to propose a control handle for a catheter or endoscope-type medical device including a control mechanism that allows orienting the distal head of the medical device, the control mechanism including at least one pivoting part in accordance with the disclosure.

Various other characteristics emerge from the description given below with reference to the appended drawings which show, by way of non-limiting examples, embodiments of the object of the disclosure.

BRIEF DESCRIPTION OF THE DRAWINGS

FIG. 1 is a schematic view of a catheter or endoscope-type medical device in a general sense including a control handle provided with a control mechanism that allows orienting the distal head of the medical device.

FIG. 2 is a plan view showing a pivoting part made in the form of a pulley provided with two actuation cables which are illustrated before and after the fixing respectively on the left part and the right part of the drawing.

FIG. 3 is a perspective view showing in detail a pivoting part provided with two actuation cables which are illustrated before and after the fixing respectively on the left part and the right part of the drawing.

FIG. 3A is a sectional view taken along the lines A-A of FIG. 3 showing the position of an actuation cable on the actuation part, before its fixing.

FIG. 3B is a sectional view taken along the lines B-B of FIG. 3 showing the fixing of an actuation cable on the actuation part.

FIG. 4 is a detail view showing a first variant of mounting of an actuation cable on a pivoting part.

FIG. 5 is a detail view showing a second variant of mounting of an actuation cable on a pivoting part.

FIG. 6 is a detail view showing another alternative embodiment of a fixing pin fitted to a pivoting part.

DESCRIPTION OF THE EMBODIMENTS

FIG. 1 illustrates, by way of example, a catheter or endoscope-type medical device 1 in a general sense designed to access the interior of a body such as a cavity or a channel for example. Conventionally, a catheter or endoscope-type medical device 1 includes an insertion tube 2 having, on one side, a proximal part $2_1$ connected to the casing 3a of a control handle 3 and, on the opposite side, a distal part $2_2$ equipped with a distal head 4. The insertion tube 2 is fixed temporarily or permanently on the casing of the control handle 3. This insertion tube 2 which has a more or less significant length and a flexibility is intended to be introduced into a natural or artificial access path with a view to performing various operations or functions for therapeutic, surgical or diagnostic purposes. The insertion tube 2 is made of a semi-rigid material and has a length adapted to the length of the conduit to be inspected and which can be included between 5 cm and 2 m. The insertion tube 2 has various cross-sectional shapes such as square, oval or circular shapes. This insertion tube 2 which is in contact with the tissues, the human organs or medical devices (trocars or probes), is essentially for single or multiple use for a patient or is even reusable after decontamination, disinfection or sterilization.

According to one preferred exemplary embodiment, the medical device 1 in accordance with the disclosure is an endoscope including a vision system able to illuminate and bring back an image of the distal part of the insertion tube 2. The endoscope thus includes a vision system mounted inside the control handle 3 and entering inside the insertion tube 2 up to the distal head 4.

Conventionally, the medical device 1 also includes a control mechanism 5 that allows orienting the distal head 4 with respect to the longitudinal axis Y of the insertion tube 2. For this purpose, the insertion tube 2 includes, upstream of the distal head 4, a bending, folding or deflection part 6 allowing the orientation of the distal head 4 with respect to the longitudinal axis Y of the insertion tube 2. This bending, folding or deflection part 6 can be made in any suitable manner to ensure the bending of the distal head 4 with respect to the longitudinal axis Y of the insertion tube 2. For example, this bending, folding or deflection part 6 can be made by a spring or by tubular vertebrae hinged together.

The control mechanism 5 can be made in any suitable manner such that the distal head 4 can be moved between a rest position in which the insertion tube 2 is rectilinear and a deflected position in which the deflection part 6 is curved. By way of non-limiting example, the control mechanism 5 can correspond to the control mechanism described in patent FR 3 047 887. For this purpose, the control mechanism 5 includes a manual control lever 11 accessible from the exterior of the casing 3a of the control handle. This control lever 11 acts directly or indirectly on at least one pivoting part 12 so as to drive the rotation of the pivoting part about a transverse axis of rotation T. This pivoting part 12 is connected to the distal head 4 so that a rotation of the pivoting part 12 causes the bending of the distal head 4.

Thus, following the application of a manual force on the control lever 11, the bending of the distal head 4 is obtained. According to one exemplary embodiment illustrated in FIG. 1, the control lever 11 is a lever guided in rotation over a limited angular range, along a transverse axis of rotation T. It should be noted that the control lever can be made in different manners, such as in the form of a pusher guided in linear displacement and urged by elastic return to act on the pivoting part via a system for transforming the linear movement of the pusher into a rotational movement of the pivoting part 12.

This pivoting part 12 is guided in rotation by an annular bearing 3p arranged in the casing or by an insert in the casing 3a. The pivoting part 12 is guided by a pivot connection so as to present only a rotational movement about the transverse axis of rotation T. The pivoting part 12 can be made in different manners by considering that the rotational movement of the pivoting part is limited to less than one turn and particularly less than one third of a turn. According to the preferred exemplary embodiment illustrated in FIG. 2, the pivoting part 12 is made in the form of a flat annular ring delimited by a circular peripheral edge 12p and a circular internal edge 12i. This pivoting part 12 thus includes two planar or flat annular faces 12f extending on either side of the pivoting part. This pivoting part 12 forms a pulley as will be better understood in the following description. Of course, the pivoting part 12 can be made in different manners, such as in the form of a semi-ring or an annulus portion, for example. Similarly, the pivoting part 12 can be made in the form of a solid disk or a cam to vary the bending in a non-linear manner.

FIG. 2 shows one exemplary embodiment of the pivoting part in the form of an annular ring 12 which is not provided with the control lever 11. For example, the control lever 11 is able to be added on one planar face 12f by any appropriate means such as by interlocking of a stud into a housing of the annular ring. Of course, the control lever 11 and the annular ring 12 can also be manufactured in one piece.

At least one and in the illustrated example, two actuation cables 13 are fixed to the pivoting part 12. These actuation cables 13 are mounted inside the insertion tube 2 to be fixed to the distal head 4. The proximal ends 13p of the actuation cables 13 are fixed to the pivoting part 12 while the distal ends 13d of the actuation cables 13 are fixed to the distal head 4. In the example illustrated, the proximal ends 13p of the actuation cables 13 are fixed in a symmetrically opposite manner on the pivoting part 12 with respect to a diametral plane.

This control mechanism 5 is adapted to ensure, for example, the left-right or up-down displacement of the distal head 4. Of course, the control mechanism 5 can be adapted to ensure the left-right and up-down displacement of the distal head 4 using three or four actuation cables 13. In the example illustrated, the control lever 11 has a rotational travel but as already described, it is possible that the control lever 11 has a translational movement causing the rotation of the pivoting part 12 via a movement transformation system.

Of course, the actuation cables 13 are made in any suitable way to ensure the movement transmission function leading to the bending of the distal head 4. Thus, these cables 13 can be made for example by rods, wires, filaments, strands or chains, made of a metal or polymer material for example. Typically, the actuation cables 13 are made of stainless steel with a diameter included between 0.1 and 2 mm.

Each actuation cable 13 is mounted inside a support sheath 14 intended to be fixed to the casing 3a of the control handle 3, using a fixing system 15 of any known type per se. The support sheath 14 thus ensures the sliding guidance of the actuation cable 13 during the operations of deflecting of the distal head 4. The actuation cable 13 thus moves in translation with respect to the support sheath 14 which is mounted secured to the control handle 3.

In accordance with the disclosure, the fixing of the actuation cables 13 with the pivoting part 12 is performed by welding. To this end, the pivoting part 12 is provided on at least one of its planar faces 12f with at least one protrusion or protuberance 16 protruding with respect to this flat face 12f. This protrusion or protuberance 16 is designated in the following description by pin 16 thus corresponding to a flue, a stud or a pad rising from the planar face 12f along a direction of extension X preferably substantially perpendicular to the planar face of the pivoting part 12, as will be described in detail in the following description. The proximal end 13p of the actuation cable 13 is fixed by welding on the pin 16 in a safe and effective manner so that the movement of the pivoting part 12 can be transmitted to the distal head 4.

In the example illustrated in FIG. 2, the control mechanism 5 includes two actuation cables 13 each fixed to the pivoting part 12 using a fixing pin 16 in accordance with the disclosure. Of course, each actuation cable 13 can be anchored to the pivoting part 12 using two fixing pins 16 for example. Advantageously, the two fixing pins 16 are located in the example illustrated, on the same planar face 12f of the pivoting part 12. The two pins 16 are located in a symmetrically opposite manner with respect to a diametral plane D of the pivoting part 12 passing through the transverse axis of rotation T. Preferably, the two pins 16 are located outside the diametral plane D to allow the actuation cables 13 to be guided over a large angular range of the pivoting part as will be explained in the following description. Of course, it can be envisaged that each planar face 12f of the pivoting part 12 includes a fixing pin 16.

Each pin 16 is passed right through by a radial recess 17 in which an actuation cable 13 is mounted. The recess 17 extends along a direction secant to the direction of extension X, for example substantially perpendicular to this direction, by opening out onto two opposite sides of the pin 16. As shown more specifically in FIG. 3B, the recess 17 includes a bottom 17a on which the actuation cable 13 is bearing. In the example illustrated in the drawings, each pin 16 is made in the form of a tube through which a recess 17 passes radially. It is clear that the pin 16 can be made by a solid cylinder through which a recess 17 passes radially.

Each actuation cable 13 thus includes an anchoring part 13a engaged in the recess 17 and extending outside the recess, by an actuation part 13b which ends with the distal end 13d fixed to the distal head 4. Preferably, the anchoring part 13a of the actuation cable 13 extends opposite to its actuation part 13b, by an end part or tip 13c. According to the alternative embodiment illustrated in FIG. 4, the actuation cable 13 engaged in the recess 17 by its anchoring part 13a, exits from one side of the pin 16, by its actuation part 13b and, from the opposite side of the pin 16, by its end part 13c.

According to the alternative embodiment illustrated in FIG. 5, part of the actuation cable 13 is wound around at least part of the pin 16. According to this alternative embodiment, the actuation cable 13 includes a winding part 13e intended to be wound around the external surface 16e of the pin 16. This winding part 13e is intended to be wound on part of or the entire external circumference of the pin 16. In the example illustrated, this winding part 13e is wound on a little less than one turn around the pin 16. Of course, this winding part 13e can be wound according to one turn or more, around the pin 16.

In the example illustrated in FIG. 5, this winding part 13e is located between the anchoring part 13a and the actuation part 13b. Of course, a winding of the actuation cable can be provided so that this winding part 13e is located between the anchoring part 13a and the end part 13c.

According to one advantageous alternative embodiment, a pin 16 includes a right polygonal external cross-section. As clearly shown in the example illustrated in FIG. 5, the pin 19 has an external surface 16e with facets delimiting ridges constituting stopping or wedging areas for the winding part 13e of the actuation cable 13. In the exemplary embodiment illustrated in FIG. 5, the pin 16 has a hexagonal external cross-section. Of course, the pin 16 may have an external cross-section different from a polygonal external cross-section such as a cylindrical section for example as illustrated in FIG. 6.

According to one advantageous alternative embodiment, the pivoting part 12 is arranged to allow the positioning and the guidance of the actuation cable 13. Thus, each pin 16 is at least partly externally bordered by a positioning housing 12n for the actuation cable 13 and particularly for the winding part 13e of the actuation cable 13. This housing 12n is arranged from the planar face 12f by surrounding around its entire perimeter the base of each pin 16. This housing 12n is made in the form of an annular groove with a width greater than the diameter of the actuation cable to authorize easy winding of the actuation cable 13 around the pin 16.

Advantageously, each positioning housing 12n opens out into a guide groove including a circular groove 12m centered on the axis of rotation T of the pivoting part and preferably also, a rectilinear groove 12r for connection between the circular groove 12m and the housing 12n. Each circular groove 12m is arranged in the planar face 12f on the periphery of the pivoting part 12. Preferably, these two circular grooves 12m each communicating with a positioning housing 12n are connected together to form a single circular guide groove for the actuation cables 13. During the pivoting of the pivoting part 12, each actuation cable 13 is thus guided by the circular groove 12m.

Preferably, each positioning housing 12n opens out, opposite to the rectilinear groove 12r, into an end groove 12e arranged in the planar face 12f to house the end part 13c of the actuation cable 13. Thus, the end 12e, housing 12n, rectilinear 12r and circular 12m grooves are arranged in the planar face 12f of the pivoting part 12 with a depth adapted to house the actuation cables 13 which are held in contact with the pivoting part due to the tension imposed on the actuation cables 13 when the pivoting part 12 is mounted in the casing 3a of the control handle. This pivoting part 12 provided with the actuation cables forms an actuation pulley able to form part of the actuation mechanism 5 for an endoscope.

After fixing the actuation cable 13 to the pin, each pin 16 of the pivoting part 12 has two branches 16a rising on either side of the recess 17 to be connected, opposite to the pivoting part 12, by a bead 18 of a material identical to the material of the pin 16. This bead 18 of material at least partly fills the recess 17 to cooperate with the actuation cable 13 and thus bind the actuation cable 13 to the pivoting part 12. In other words, this bead 18 is in intimate contact with the actuation cable 13 while being able to be inserted into the thickness of the actuation cable from its external surface. The bead 18 thus ensures the blocking in translation of the actuation cable 13.

According to one characteristic of the disclosure, the actuation cable 13 is fixed by welding to the pin 16. According to one characteristic of the disclosure, the pins 16 are made of thermoplastic material that is to say of a material capable of being softened by heating, above a certain temperature and hardened by cooling. For example, the material in which the pins 16 are made falls under the category of semi-crystalline or amorphous thermoplastic polymers. Typically, the pins 16 are for example made of ABS (acrylonitrile butadiene styrene), PP (polypropylene), POM (polyoxymethylene), polyamide, polyurethane, PE (polyethylene), PS (polystyrene), or PVC (poly(vinyl chloride)), or any mixture of these polymers.

According to one advantageous alternative embodiment, the pivoting part 12 is made of a thermoplastic material. According to one preferred alternative embodiment, the pivoting part 12 and the pins 16 are made from the same thermoplastic material. Typically, the pivoting part 12 is manufactured according to the molding technique during which the pins 16 and the pivoting part 12 are formed simultaneously. Of course, it could be envisaged to add the pins 16 on the planar face 12p of the pivoting part 12.

The fixing of an actuation cable 13 on the pivoting part 12 using a fixing pin 16 is carried out by the method described below.

The first step of the fixing method includes providing a pivoting part 12 for a control mechanism 5 for an endoscope, provided with at least one pin 16 made of thermoplastic material, adapted to allow the fixing of an actuation cable 13. In the example illustrated, the pivoting part 12 includes, for each actuation cable 13, a pin 16 rising in the vicinity of each other, from the planar face 12f of the pivoting part 12 and each made in the form of a shank or a tubular duct.

Advantageously, the pivoting part 12 and the pins 16 are made in the same manufacturing step. The pivoting part 12 and the pins 16 are thus made in a thermoplastic material and preferably in the same thermoplastic material. However, a step aimed at adding the pins 16 on the pivoting part 12 by fixing them by any suitable means on the pivoting part 12 cannot be excluded.

From the terminal part of the pin 16, a radially through recess 17 is arranged to allow the insertion of the actuation cable 13. This recess 17 is open in the opposite direction of the planar face 12f to allow the engagement of the actuation cable 13 from the terminal part of the pin 16. This recess 17 is preferably made during the manufacturing step of the pin 16. Advantageously, the pivoting part 12 and the pins 16 provided with the recesses 17 are made in the same manufacturing step. Typically, the pivoting part 12 and the pins 16 provided with the recesses 17 are made by injection molding. Of course, this recess 17 can be made during a subsequent step to the actual manufacturing step of the pin 16. Also advantageously, the end 12e, housing 12n, rectilinear 12r and circular 12m grooves are arranged in the planar face 12f of the pivoting part 12, in the same manufacturing step as the pivoting part 12 and the pins 16.

According to the alternative embodiment illustrated in the drawings, the recess 17 has a bottom 17a rising above the planar face 12f of the pivoting part 12. Of course, the bottom 17a of the recess 17 can correspond to the planar face 12f of the pivoting part 12. The bottom 17a of the recess 17 is able to form an abutment or bearing surface for the actuation cable 13.

According to one embodiment characteristic, the recess 17 is made with a determined depth so that once the actuation cable 13 is inserted into the recess, the pin 16 has a free end 16I extending beyond or above the actuation cable 13. This free end 16I corresponds to the part of the branches 16a which projects beyond or above the actuation cable 13. In other words, the depth of the recess 17 is strictly greater than the diameter of the actuation cable 13. For example, the recess 17 is arranged with a depth equal to a value included between 1.5 and 5 times the diameter of the actuation cable 13. Each pin 16 thus includes two branches 16a rising on either side of the recess 17, presenting a free end 16I protruding with respect to the actuation cable 13.

The fixing method thus includes positioning the actuation cable 13 inside the recess 17 set back from the terminal part of the pin 16. The step of inserting the support sheath 14 inside the recess 17 can be carried out manually or automatically using a robotic arm. According to one advantageous characteristic, the insertion of the actuation cable 13 inside the recess 17 is carried out until the actuation cable 13 comes into abutment on the bottom 17a of the recess 17.

Preferably, the actuation cable 13 is positioned in the recess 17 so that an end part 13c extends beyond the recess 17, opposite to the actuation part 13b. For example, this end part 13c is cut in line with the peripheral edge 12p of the pivoting part 12.

According to one advantageous alternative embodiment, part of the actuation cable 13 is wound around at least a part of the fixing pin 16. According to this variant, each actuation cable 13 is wound around a pin 16, by its winding part 13e, from the end part 13c or from the actuation part 13b (left part of FIG. 2). Such winding of the actuation cable 13 around the pin 16 reinforces the anchoring of the actuation cable 13 to the pivoting part 12. A pin 16 with ridges increases the fixing quality.

The fixing method includes heating at least the free end of the fixing pin 16 and applying a pressure on the pin 16 to ensure, by welding, the fixing of the actuation cable 13 to the pivoting part 12. As shown in FIG. 3A, at least the pressure force is exerted using a welding head 20 adapted to the welding method implemented. Indeed, the heat can be supplied by the welding head 20 and/or by a device independent of the welding head 20. In the same way, the heat can be supplied before the application of the pressure force or simultaneously to the application of the pressure force. This step of welding the actuation cable 13 inside the recess 17 can be carried out manually or automatically using a robotic arm. For example, the displacement parameters of the welding head 20 as well as the temperature parameters which can be defined to obtain effective welding are able to be reproduced for all the pins 16 of the pivoting parts 12.

The supply of heat at the level of the free end of the pin 16 leads to its softening so that the material is moved under the effect of the application of a pressure along a direction of approximation of the welding head 20 in the direction of the actuation cable 13, represented by the arrow f1 in FIG. 3A. The direction of displacement of the welding head 20 is advantageously established parallel to the direction of extension X of the pin 16. In the illustrated example, the welding head 20 bears on the terminal part of the free end 16I of the pin 16. Advantageously, the welding head 20 is moved with respect to the pin 16. Of course, it can be envisaged to move the pin 16, namely the pivoting part 12 with respect to the welding head 20.

The moved thermoplastic material comes into contact or cooperate with the actuation cable 13 which thus becomes secured to the pin 16. At least part of the moved thermoplastic material thus enters inside the recess 17 (FIG. 3B). According to one advantageous variant of the fixing method, a pressure is exerted on the fixing pin 16 so as to move the softened material until obtaining a protrusion, a bead or a river set 18 in contact with the actuation cable 13 or entering the surface of the actuation cable 13 (right part of FIGS. 2 and 3 and FIG. 3B). This bead 18 comes from the thermoplastic material resulting from the deformation of at least the free end 16I of the pin 16. This bead 18 of course remains attached to the pin 16 by forming a single piece. Compared to its state before deformation, the pin 16 is deformed according to a greater or lesser height of its free end 16I.

According to one advantageous variant of the fixing method, a pressure is exerted on the fixing pin 16 until obtaining a bead 18 closing the recess 17 at least locally at the level of the two walls of the tube forming the pin 16. The moved thermoplastic material thus forms an annulus-shaped bead above the actuation cable 13 entering the recess and closing the recess 17. Of course, it can be provided to make a bead 18 in the form of a sold disk.

The fixing of the actuation cable 3 to the pivoting part 12 is carried out by the implementation of a hot riveting process (laser, induction, hot air, infra-red for example) or a vibration friction welding process (orbital, longitudinal or axial friction).

According to one exemplary implementation, the fixing of the actuation cable 3 to the pivoting part 12 is carried out by the implementation of an ultrasonic welding process. According to this exemplary embodiment, the pivoting part 12 is for example positioned on an anvil and the welding head 20 such that a vibrating sonotrode is applied on the terminal part of the pin 16 by being moved a few mm to move the material of the pin.

The method according to the disclosure allows obtaining a pivoting part 12 provided with pins 16 ensuring the fixing of actuation cables 13 of the distal head 4 of a catheter or endoscope-type medical device 1. This pivoting part 12 forms part of a control mechanism 5 mounted in a control handle for a catheter or endoscope-type medical device 1.

The invention claimed is:

1. A method for fixing one end of an actuation cable forming part of a control mechanism configured to allow orienting of a distal head of a medical device, the method comprising:
   providing a pivoting part forming part of a control mechanism configured to allow orienting of a distal head, the pivoting part being provided with at least one pin made of thermoplastic material for fixing a proximal end of an actuation cable;
   arranging, from a terminal part of the pin, a radially through recess to allow the insertion of the actuation cable;
   positioning the actuation cable inside the recess, letting a free end of the pin project; and
   heating at least the free end of the pin using a welding head bearing on the terminal part of the free end of the pin; and
   applying a pressure on the pin to move the thermoplastic material until obtaining a bead in contact with the actuation cable and at least partially closing the recess, to ensure, by welding, the fixing of the actuation cable with the pivoting part,
   wherein the recess is arranged with an abutment bottom for inserting the actuation cable into the recess, the depth of the recess being such that the free end of the pins extends beyond the actuation cable, and the recess is arranged with a depth equal to a value between 1.5 and 5 times a diameter of the actuation cable.

2. The fixing method according to claim 1, according to which the pivoting part and the pin are made of a thermoplastic material.

3. The fixing method according to claim 1, according to which a pivoting part is provided with at least one pin including a polygonal external cross-section.

4. The fixing method according to claim 1, according to which part of the actuation cable is wound around at least part of the pin.

5. The fixing method according to claim 1, according to which an ultrasonic welding ensures fixing of the actuation cable to the pivoting part.

6. The fixing method according to claim 1, according to which heat and pressure riveting ensures fixing of the actuation cable to the pivoting part.

\* \* \* \* \*